United States Patent
Gou et al.

(10) Patent No.: US 11,840,621 B2
(45) Date of Patent: Dec. 12, 2023

(54) METHOD OF MAKING A HOMOGENEOUS MIXTURE OF POLYOLEFIN AND LIQUID ORGANIC ACID

(71) Applicant: Dow Global Technologies LLC, Midland, MI (US)

(72) Inventors: Qian Gou, Collegeville, PA (US); Neil W. Dunchus, Collegeville, PA (US); Dachao Li, Royersford, PA (US); Michael J. Parker, Bristol, PA (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 197 days.

(21) Appl. No.: 17/595,345

(22) PCT Filed: Jun. 22, 2020

(86) PCT No.: PCT/US2020/038882
§ 371 (c)(1),
(2) Date: Nov. 15, 2021

(87) PCT Pub. No.: WO2020/263721
PCT Pub. Date: Dec. 30, 2020

(65) Prior Publication Data
US 2022/0259404 A1   Aug. 18, 2022

Related U.S. Application Data

(60) Provisional application No. 62/867,262, filed on Jun. 27, 2019.

(51) Int. Cl.
*C08K 5/42* (2006.01)
*C08J 3/20* (2006.01)

(52) U.S. Cl.
CPC ........ *C08K 5/42* (2013.01); *C08J 3/20* (2013.01); *C08J 2323/08* (2013.01)

(58) Field of Classification Search
CPC ............ C08K 5/42; C08J 3/20; C08J 2323/08
See application file for complete search history.

(56) References Cited

U.S. PATENT DOCUMENTS

| | | | |
|---|---|---|---|
| 4,490,323 | A | 12/1984 | Thomson |
| 5,516,814 | A | 5/1996 | Trotoir |
| 6,172,138 | B1 | 1/2001 | Materne et al. |
| 6,448,310 | B1 | 9/2002 | Markezich |
| 2006/0281850 | A1 | 12/2006 | Tokunaga et al. |
| 2018/0085241 | A1 | 3/2018 | Forsell |

FOREIGN PATENT DOCUMENTS

| | | | |
|---|---|---|---|
| CN | 206899549 U | 1/2018 | |
| EP | 0775719 | 5/1997 | |
| EP | 1433811 A2 | 6/2004 | |
| EP | 2072568 B1 | 12/2011 | |
| JP | 61120720 A * | 6/1986 | ......... B29C 47/0004 |
| WO | 2002/088239 B1 | 4/2003 | |
| WO | 2006/101754 A1 | 9/2006 | |

OTHER PUBLICATIONS

English machine translation of JP 61120720A. (Year: 1986).*
PCT/US2020/038882, International Search Report and Written Opinion dated Sep. 18, 2020.

* cited by examiner

*Primary Examiner* — John E Uselding

(57) ABSTRACT

A method of making a homogeneous mixture comprising a liquid hydrocarbylsulfonic acid and a polyolefin, the method comprising multiple stages of adding, mixing, and monitoring of temperature of the ingredients. The method enables making embodiments of the homogeneous mixture having more than 3 weight percent of the liquid hydrocarbylsulfonic acid incorporated into the polyolefin and prevents fouling of the mixer device.

7 Claims, No Drawings

METHOD OF MAKING A HOMOGENEOUS MIXTURE OF POLYOLEFIN AND LIQUID ORGANIC ACID

FIELD

Mixing polyolefins with additives.

INTRODUCTION

Patents and patent application publications in or about the field include CN 206899549 U; EP 0 775 719 A2; U.S. Pat. Nos. 4,490,323; 5,516,814; 6,172,138 B1; 6,448,310 B1; U.S. 2006/0281850 A1; WO 2002/088239 A1; and WO 2006/101754 A1.

A moisture-curable polyethylene formulation comprises a (hydrolyzable silyl group)-functional polyethylene copolymer (HSG-FP Copolymer) and a silanol condensation catalyst. The silanol condensation catalyst may be an organic acid effective for catalyzing moisture-based condensation curing of the hydrolyzable silyl groups to form a crosslinked polyethylene as a networked polymer.

SUMMARY

We encountered a loading limit problem when incorporating a liquid silanol condensation catalyst into a polyethylene carrier resin to make a catalyst masterbatch. The silanol condensation catalyst, also known as a moisture cure catalyst, may be provided to the moisture-curable polyethylene formulation in the form of a catalyst masterbatch comprising a carrier resin and the silanol condensation catalyst. The resulting embodiment of the moisture-curable polyethylene formulation comprises the HSG-FP Copolymer, the carrier resin, and the silanol condensation catalyst. The carrier resin typically is a polyolefin such as a polyethylene or a polypropylene. All other things being equal, the higher the loading of the silanol condensation catalyst in the catalyst masterbatch, the higher the final loading of the silanol condensation catalyst that may be reached in the moisture-curable polyethylene formulation and the greater the flexibility in using the catalyst masterbatch to prepare moisture-curable polyethylene formulations with a wide range of loading levels of the silanol condensation catalyst. Because of their tendencies to be immiscible in each other—the polyolefin carrier resin is a non-polar hydrocarbon and the silanol condensation catalyst typically is a polar protic acid such as a liquid organic acid (e.g., a carboxylic acid or a hydrocarbylsulfonic acid)—making a homogeneous mixture having a loading level much above 2 weight percent of the liquid organic acid in the polyolefin is difficult.

We also encountered a mixer fouling problem when trying to mix a liquid hydrocarbylsulfonic acid into polyolefin pellets using a mixer device to yield a homogeneous mixture of the polyolefin and the liquid hydrocarbylsulfonic acid. The mixer device generates shear heating during a mixing operation. Shear heating raises the temperature of the materials in the mixer device enough to eventually melt the polyolefin pellets. An unmixed portion of the liquid hydrocarbylsulfonic acid remains, however, and fouls the mixer device. The fouling could be seen with a naked eye as dark-colored residues from the hydrocarbylsulfonic acid on surfaces of the mixer device. The mixer device would require regular cleaning to prevent the residues from building up and halting production, which cleaning temporarily takes the mixer device out of service. Further, we failed to achieve a homogeneous mixture with a loading level of more than 2 weight percent of the liquid hydrocarbylsulfonic acid in the polyolefin.

We attempted to solve both the loading limit and mixer fouling problems by trying any one of actions (a) to (e): (a) decreasing the mixing temperature and/or shortening the mixing time period; (b) increasing the mixing temperature and/or lengthening the mixing time period; (c) limiting the maximum loading of the liquid hydrocarbylsulfonic acid; (d) changing the time point of addition of one or more stabilizer additives (e.g., antioxidants) to the polyolefin: or (e) replacing the polyolefin pellets with polyolefin granules, a more finely-divided physical form. These actions by themselves, however, failed to solve at least one of the loading limit and mixer fouling problems. For example, attempts to solve the mixer fouling problem by (a) decreasing the mixing temperature (cooling the mixer device) or shortening the mixing time period would result in less effective mixing and concomitant greater levels of unmixed portion of the liquid hydrocarbylsulfonic acid. Attempts to solve the loading limit problem by (b) increasing the mixing temperature (heating the mixing device) and/or lengthening the mixing time period over-consumed the stabilizer additives (e.g., antioxidants) in the polyolefin, which decreased heat-aging performance of the homogeneous mixture in end use applications. The mixer fouling problem also worsened. Thus, to minimize consumption of stabilizer additives (e.g., antioxidants) in the polyolefin, we decided to keep the mixing temperature from exceeding 170 degrees Celsius (° C.). Attempts to solve the mixer fouling problem by (c) limiting the maximum loading of the liquid organic acid per unit weight of the polyolefin worsened the loading limit problem. Attempts to solve the heat aging problem by (d) changing the time point for adding the one or more stabilizer additives into the polyolefin polymer did not prevent the mixer fouling problem and handcuffed the flexibility and limited the usefulness of the homogeneous mixture as a catalyst masterbatch for different end use applications with different stabilizer requirements. Attempts to solve the fouling problem by (e) replacing the polyolefin pellets with polyolef in granules failed to prevent the accumulation of unmixed liquid hydrocarbylsulfonic acid and did not solve the mixer fouling problem.

We discovered a method of making in a mixer device a homogeneous mixture comprising a liquid hydrocarbylsulfonic acid and a polyolefin . The method uses granular polyolefin and comprises the following steps carried out in the mixing device (in its mixing chamber). Mixing recently added liquid hydrocarbylsulfonic acid into an initial polyolefin formulation consisting essentially of a major portion, but not all, of the polyolefin, to give a first admixture, wherein the polyolefin is in the form of granules and wherein from the time of adding the liquid hydrocarbylsulfonic acid to the start of the mixing the temperature of the initial polyolefin formulation is in a first target temperature range that enables incorporating the liquid hydrocarbylsulfonic acid into the polyolefin and is below the melting temperature of the polyolefin, and continuing the mixing until temperature of the first admixture increases (e.g., as a result of heat generated by the mixing, i.e., heat of mixing) to a second target temperature range, which is higher than the first target temperature range; adding a minor portion of the polyolefin, in the form of granules, to the first admixture; and mixing to give a second admixture while monitoring temperature of the second admixture while the shear heating is increasing the temperature thereof until temperature of the second admixture reaches a final target temperature range from 145° to 150° C., thereby making in the mixer device the homogeneous mixture, wherein all of the liquid hydrocarbylsulfonic acid is incorporated into the polyolefin. The method enables making embodiments of the homogeneous mixture having more than 3 weight percent of the liquid hydrocarbylsulfonic acid incorporated into the polyolefin and prevents fouling of the mixer device.

DETAILED DESCRIPTION

A method of making in a mixer device a homogeneous mixture comprising a liquid hydrocarbylsulfonic acid and a polyolefin, the method comprising steps (1) to (3): (1) mixing recently added liquid hydrocarbylsulfonic acid into an initial polyolefin formulation consisting essentially of a major portion, but not all, of the polyolefin to give a first admixture, wherein the polyolefin is in the form of granules and wherein from the time of adding the liquid hydrocarbylsulfonic acid to the start of the mixing the temperature of the initial polyolefin formulation is in a first target temperature range that enables incorporating the liquid hydrocarbylsulfonic acid into the polyolefin and is below the melting temperature of the polyolefin, and continuing the mixing until temperature of the first admixture increases (e.g., as a result of heat of mixing) to a second target temperature range, which is higher than the first target temperature range; adding a minor portion of the polyolefin, in the form of granules, to the first admixture to give a second admixture; and (3) mixing the second admixture until temperature of the second admixture increases to a final target temperature range from 145° to 150° C., thereby making in the mixer device the homogeneous mixture, wherein all of the liquid hydrocarbylsulfonic acid is incorporated into the polyolefin.

The method may further comprise a preliminary step before step (1), the preliminary step comprising adding the liquid hydrocarbylsulfonic acid to the initial polyolefin formulation in the mixer device just before start of step (1) mixing, wherein during the adding the temperature of the initial polyolefin formulation is in a first target temperature range. That is, the major portion of the polyolefin is not contacted with the liquid hydrocarbylsulfonic acid unless the temperature of the major portion of the polyolefin is already in the first target temperature range.

The method enables making embodiments of the homogeneous mixture having more than 3 weight percent of the liquid hydrocarbylsulfonic acid incorporated into the polyolefin and prevents fouling of the mixer device. Without being bound by theory, if the polyolefin would be used in the form of pellets and/or if the polyolefin would not be divided into the major and minor portions thereof and used separately, not enough of the liquid hydrocarbylsulfonic acid would get incorporated into the polyolefin, and the quantity of the minor portion of the polyolefin would be insufficient to absorb all of the remaining pooled or unincorporated liquid hydrocarbylsulfonic acid, and the resulting non-homogeneous admixed material would have too low a loading limit and would foul the mixer device. The same problems would occur if the liquid hydrocarbylsulfonic acid were to be added to the heated material before temperature of the heated material reached the first target temperature range, if the liquid hydrocarbylsulfonic acid were to be added to fully-melted material, and/or if the temperature of the admixed material failed to reach 145° C. If temperature of the second admixed material would go above 150° C., the resulting heat aging could hurt performance of the second admixed material in end use applications.

The expression "the initial polyolefin formulation consisting essentially of a major portion of the polyolefin in the form of granules" means that the initial polyolefin formulation is free of a minor portion of the polyolefin and free of the liquid hydrocarbylsulfonic acid.

The expression "effective for incorporating the liquid hydrocarbylsulfonic acid and below the melting temperature of the polyolefin" means a degree of hotness at which at least 90 weight percent of the liquid hydrocarbylsulfonic acid can be absorbed into the major portion of the polyolefin, in the form of granules. This temperature may be from 95 to 105 degrees Celsius (° C.).

The term "granules" means having an average particle size of from 0.2 millimeter (mm) to 1.5 mm, alternatively from 0.20 mm to 0.80 mm.

The method may further comprise a preliminary step, before the step of adding the liquid hydrocarbylsulfonic acid to the initial polyolefin formulation in the mixer device, of heating the initial polyolefin formulation from a temperature below the first target temperature range (e.g., from ambient temperature) to the first target temperature range. The term "heating" means increasing the temperature of a material. The heating may be accomplished by exchanging heat from an external heat source via the mixer device into the initial polyolefin formulation; alternatively by mixing the initial polyolefin formulation in the mixer device, thereby generating heat of mixing; or a combination thereof. Typically, the heating is mixing the initial polyolefin formulation (consisting essentially of granules of the major portion of the polyolefin) in the mixer device, thereby generating the heat of mixing.

The expressions "major portion of the polyolefin" and "minor portion of the polyolefin" refer to greater and lesser, respectively, weight fractions of the total amount of the polyolefin in the homogeneous mixture. For example, if the total amount of the polyolefin in the homogeneous mixture is said to be 100 weight parts (a relative amount), the major portion of the polyolefin may be from 90 to 99 weight parts and the minor portion of the polyolefin may be from 10 to 1 weight parts, respectively. The major portion of the polyolefin may be free of an additive and free of any other polymer; alternatively the major portion of the polyolefin may contain at least one additive and may be free of any other polymer. The minor portion of the polyolefin may be free of an additive and free of any other polymer; alternatively the minor portion of the polyolefin may contain at least one additive and may be free of any other polymer. The at least one additive of that embodiment of the major portion of the polyolefin may be the same as, or different than, the at least one additive of that embodiment of the minor portion of the polyolefin. The polyolefin of the major portion thereof may be the same as, or different than, the polyolefin of the minor portion thereof. The polyolefin may be a high-density polyethylene.

The expression "a second target temperature range, which is higher than the first target temperature range" means that the lower endpoint of the second target temperature range is higher than the upper endpoint of the first target temperature range.

The expression "liquid" means a state of matter characterized at 25° C. as an amorphous fluid having a definite volume but not a definite shape; between gas and solid states. The expression "solid" means a state of matter characterized at 25° C. as having a definite volume and shape.

Melting means changing a material from a solid state of matter to a liquid state of matter. Typically, melting means the changing is complete such that the liquid state of matter contains no unmelted form of the material.

The expression "recently added" means that the liquid hydrocarbylsulfonic acid may sit in contact with the major portion of the polyolefin without mixing for at most one hour, alternatively for at most 30 minutes, alternatively for at most 5 minutes, alternatively for at most 30 seconds, alternatively 0 seconds. In the latter aspect the liquid hydrocarbylsulfonic acid is added during the step (1) mixing, alternatively added at a measured rate (metered) during the step (1) mixing.

The mixing comprises mechanically moving means putting in motion by applying, whether manually or via a machine, a direct contact force wherein a physical object (e.g., a stirrer paddle, a screw, a plunger, or a blender) touches and thereby moves a material. Examples of mechanically moving are stirring, rotor mixing, screw mixing, plunger mixing, blender mixing, and other direct physically contacting. The contact force does not include electromagnetic force, gravity, acoustic force, or convective force.

The method may further comprise a feature substantially without or completely without soaking (or imbibing) the liquid hydrocarbylsulfonic acid into the polyolefin granules. Soaking requires miscibility of the liquid hydrocarbylsulfonic acid in the polyolefin granules and effective soaking conditions. Such soaking conditions comprise a sufficient period of time (e.g., 8 to 16 hours) and a sufficient elevated temperature (e.g., from 60° to 90° C.) to allow migration of the liquid hydrocarbylsulfonic acid into the polyolefin granules.

Additional inventive aspects follow; some are numbered below for ease of reference.

Aspect 1. A method of making in a mixer device a homogeneous mixture comprising from 1 to 6 weight parts of a liquid hydrocarbylsulfonic acid per 100 weight parts of a polyolefin, the method comprising steps (1) to (3): (1) mixing, in a pressurized mixing operation conducted in a pressurizable mixer device, recently added liquid hydrocarbylsulfonic acid into an initial polyolefin formulation consisting essentially of from 90 to 98 weight parts of the polyolefin to give a first admixture, wherein the polyolefin is in the form of granules and wherein from the time of adding the liquid hydrocarbylsulfonic acid to the start of the mixing the temperature of the initial polyolefin formulation is in a first target temperature range from 95° to 105° C., and continuing the mixing until the temperature of the first admixture increases (e.g., as a result of heat of mixing) to a second target temperature range from 115° to 125° C.; (2) adding from 10 to 2 weight parts of the polyolefin in the form of granules to the first admixture to give a second admixture; and (3) mixing, in a pressurized mixing operation conducted in a pressurizable mixer device, the second admixture until temperature of the second admixture increases to a final target temperature range from 145° to 150° C., thereby making in the mixer device the homogeneous mixture, wherein all of the liquid hydrocarbylsulfonic acid is incorporated into the 100 weight parts of the polyolefin. When temperature of the first admixture reaches the second target temperature range and just before starting step (3), some minor portion of the from 1 to 6 weight parts of the liquid hydrocarbylsulfonic acid may be unincorporated into the polyolefin. This may be visually observed as an accumulation or pool of the unincorporated minor portion under or on the surface of first admixture. The method may further comprise the preliminary step before step (1), the preliminary step comprising adding the liquid hydrocarbylsulfonic acid to the initial polyolefin formulation in the mixer device, wherein during the adding temperature of the initial polyolefin formulation is in a first target temperature range. The mixer device may further be the mixer device described later, such as a twin-rotor batch mixer device.

Aspect 2. The method of aspect 1 wherein step (3) comprises mixing in a first direction the first admixture with the added from 10 to 2 weight parts of the polyolefin to give a second admixture and continue mixing until temperature of the second admixture is increased to a third target temperature range from 135° to 140° C.; followed by mixing in a second direction the second admixture until temperature of the second admixture is increased to the final target range from 145° to 150° C., wherein the second direction of mixing is orthogonal to the first direction of mixing. By orthogonal, when represented by three axes x-, y-, and z-axes for example, the first direction of mixing may be along an axis of a mixing element (e.g., a rotor or screw) and the second direction of mixing may be perpendicular to the axis of the mixing element. The orthogonal mixing may further comprise mixing in a third direction that is circular around the axis of the mixing element (e.g., around the circumference of the rotor or screw). Certain mixer devices are designed to accommodate orthogonal mixing operations. In some aspects the mixing in the first direction and the mixing in the second direction comprise the pressurized mixing operation conducted in the pressurizable mixer device used for step (3) of aspect 1.

Aspect 3. The method of aspect 2 wherein, after mixing in the first direction and before mixing in the second direction, step (3) is interrupted by an unpressurized mixing operation step conducted in an unpressurized mixer device, comprising allowing the second admixture to relax for a period of time while being subjected to unpressurized mixing; wherein during the relaxing the temperature of the second admixture remains in the third target temperature range or is allowed to decrease to a minimum of 120° C.

Aspect 4. The method of any one of aspects 1 to 3 wherein the initial polyolefin formulation further consists essentially of at least one first solid additive, or a melt thereof; wherein the first admixture further consists essentially of the at least one first solid additive or the melt thereof; and wherein the homogeneous mixture comprises the 100 weight parts of the polyolefin, the from 1 to 6 weight parts of the liquid hydrocarbylsulfonic acid, and the at least one first solid additive.

Aspect 5. The method of any one of aspects 1 to 3 wherein step (2) further comprises adding at least one second solid additive to the first admixture; wherein the second admixture further comprises the at least one second solid additive, or a melt thereof; and wherein the homogeneous mixture comprises the 100 weight parts of the polyolefin, the from 1 to 6 weight parts of the liquid hydrocarbylsulfonic acid, and the at least one second solid additive.

Aspect 6. The method of any one of aspects 1 to 3 wherein the initial polyolefin formulation further consists essentially of at least one first solid additive, or a melt thereof; wherein the first admixture further consists essentially of the at least one first solid additive or the melt thereof; wherein step (2) further comprises adding at least one second solid additive to the first admixture; wherein the second admixture further comprises the at least one second solid additive, or a melt thereof; and wherein the homogeneous mixture comprises the 100 weight parts of the polyolefin, the from 1 to 6 weight parts of the liquid hydrocarbylsulfonic acid, the at least one first solid additive, and the at least one second solid additive. In some aspects at least one, alternatively all but one, alternatively each of the at least one first solid additive is different in composition than at least one, alternatively all but one, alternatively each of the at least one second solid additive.

Aspect 7. The method of any one of aspects 1 to 6 wherein the number of weight parts of the liquid hydrocarbylsulfonic acid is from 2 to 6, alternatively from 3 to 6, alternatively from 3 to 5, alternatively from 3.5 to 4.1, all per 100 weight parts of the polyolefin.

Aspect 8. The method of any one of aspects 1 to 7 further comprising after step (3) a step (4) mixing at least a portion of the homogeneous mixture with (A) a (hydrolyzable silyl group)-functional polyethylene copolymer (HSG-FP Copolymer) so as to give a moisture-curable polyethylene formulation comprising the at least portion of the homogeneous mixture and the (A) HSG-FP Copolymer. In preparing the moisture-curable polyethylene formulation, at least a portion of the homogeneous mixture may function as a catalyst masterbatch comprising the liquid hydrocarbylsulfonic acid as the silanol condensation catalyst and the polyolefin as a carrier resin. The mixing of step (4) may comprise a pressurized mixing operation conducted in a pressurizable mixer device, alternatively an unpressurized mixing operation conducted in the pressurizable mixer device.

Aspect 9. A homogeneous mixture made by the method of any one of claims 1 to 7.

Aspect 10. A moisture-curable polyethylene formulation made by the method of aspect 8.

The method may be conducted in a mixing chamber of any mixer device that generates shear heating during a mixing operation conducted therein and that is effective for making polyolefin formulations and monitoring temperature thereof during at least a part of the mixing operation in the mixer device. The mixer device may be further configured as a pressurizable mixer device, which is a mixer device that is separately configurable for conducting pressurized mixing operations and unpressurized mixing operations. The mixer device may be further configured for an orthogonal mixing operation as described later. The mixer device may be further configured as a batch mixer device for conducting batch mixing operations. The mixer device may be a pressurizable batch mixer device configured for conducting pressurized and unpressurized batch mixing operations.

The method uses the mixer device. The mixer device used mixing step (1) of the method may be the same as or different than the mixer device used in mixing step (3) of the method and/or the same as or different than the mixer device used in the unpressurized mixing step, if any. The mixer device used in mixing step (4) may be the same as, alternatively different than the mixer device used in steps (1), (3), and the optional unpressurized mixing step. The adding step (2) may be carried out in the mixer device used in step (1) or (2) or both.

The mixer device may comprise a mixing chamber for holding materials to be mixed, at least one mixing element for mixing the materials in the mixing chamber, a sealing element that is movable from an open position for conducting an unpressurized mixing operation to a closed position for sealing and increasing pressure in the mixing chamber for conducting a pressurized mixing operation (and vice versa movable from the closed position to the open position), a temperature sensor for measuring temperature of the materials during the pressurized mixing operation, and a discharge door that is movable from a closed position for conducting a mixing operation to an open position for allowing mixed materials to be discharged from the mixer device (and vice versa movable from the closed position to the open position). The temperature sensor may be disposed in the sealing element in such a way that when the sealing element is in its closed position the temperature sensor is positioned to sense the temperature of the materials in the mixing chamber. The mixer device may further comprise an external jacket that substantially surrounds the mixing chamber and defines channels through which a heat transfer fluid may be circulated to modulate temperature of the walls of the mixing chamber, which in turn may modulate temperature of the contents of the mixing chamber. Typically during a mixing operation the heat transfer fluid is not circulated or an ambient temperature heat transfer fluid is circulated or a chilled heat transfer fluid is circulated.

Each of the at least one mixing elements independently may be a rotor or screw element. Each rotor or screw element may be independently rotatable. Each rotor or screw element may independently define internal heat-transfer channels through which a heat transfer fluid may be circulated so as to modulate the temperature of the rotors or screw elements during a mixing operation. The at least one mixing element may consist of at most two mixing elements, e.g., at most two rotors or two screw elements.

Mixing steps (1) and (3) of the method may comprise a pressurized mixing operation conducted in a pressurizable mixer device wherein the sealing element and discharge door of the mixer device are in their closed positions, such as the pressurized mixing operations of steps (1) and (3) of aspect 1. Step (3) of the method may be divided into two separate pressurized mixing operations conducted sequentially in a pressurizable mixer device, such as those operations described in aspect 2. The embodiment of step (3) that is divided into two separate pressurized mixing operations may be interrupted by an intermediate step comprising an unpressurized mixing operation conducted in the pressurizable mixer device wherein the sealing element is in its open position and the discharge door is in its closed position, such as the unpressurized mixing operation described in aspect 3.

The pressurizable mixer device of the immediately preceding paragraph may be a twin-rotor batch mixer device. In the twin-rotor batch mixer device, the at least one mixing element may consist of twin rotors spaced apart from, and parallel to, each other in the mixing chamber and rotatable in opposite directions. For example, one of the twin rotors may be a first rotor rotatable in a clockwise direction and the other of the twin rotors may be a second rotor rotatable in a counterclockwise direction, and vice versa. The mixing chamber may be sub-divided into first and second half-chambers that are in fluid communication with each other. During a pressurized mixing operation when the mixing chamber of the pressurizable mixer device is sealed by the sealing element (e.g., ram is in a down-position) and pressure in the mixing chamber is greater than ambient pressure (at ram pressure), materials in the first half-chamber may be mixed by the first rotor and materials in the second half-chamber may be mixed by the second rotor, but relatively little or no materials may be transferred between the first and second half-chambers. During an unpressurized or "relaxed" mixing operation when the mixing chamber of the pressurizable mixer device is not sealed by the sealing element (e.g., ram is in an up-position), and pressure in the mixing chamber is approximately ambient pressure, materials in the first half-chamber may be mixed by the first rotor and materials in the second half-chamber may be mixed by the second rotor, and further portions of the materials may be transferred between the first and second half-chambers. The first rotor of the twin rotors may disposed in the first half-chamber and the second rotor of the twin rotors may be disposed in the second half-chamber. The twin-rotor batch mixer device may have orthogonal mixing capability. Orthogonal mixing may occur in both directions of the x and y axis concurrently, meaning the materials being mixed flow between the first and second half-chambers along the y-axis, as well as in both directions along each of the rotor axes (each rotor axis is along an x-axis) within a specific half-chamber. In the pressurized mixing operation, wherein the sealing element has been lowered and the mixing chamber is sealed and pressurized by the sealing element (e.g., ram is in a down-position), the materials are allowed less room to turnover or flow between the first and second half-chambers, and thus the rate of flow between the first and second half-chambers is less than in an unpressurized mixing operation. In the unpressurized mixing operation, wherein the sealing element is in a raised or relaxed position (e.g., ram is in an up position) and the mixing chamber is not sealed or pressurized by the sealing element the materials are allowed more room to turnover, and the rate of flow of the materials between the first and second half-chambers along the y-axis is greater than in the pressurized mixing operation.

The mixing conditions in the pressurizable mixer device, including the twin-rotor batch mixer device, may be controlled by setting pressure in the mixing chamber and rotation speed of the rotors and temperature of the heat transfer fluid, if any, circulating through the rotors. The pressure in a pressurizable mixer device for any given pressurized mixing step (e.g., step (1)) independently may be the same as or different than the pressure in the pressurizable mixer device for another pressurized mixing step (e.g., step (3)). Temperature of the materials in the mixing chamber may be monitored by the temperature sensor. The temperature of the materials in any given mixing step (pressurized or unpressurized) independently may be the same as or different than the temperature of the materials in another mixing step (pressurized or unpressurized).

Solid materials may be added into the mixing chamber of the pressurizable mixer device when the sealing element is in its open position. The pressurizable mixer device may be configured with a liquid injection system having a metering capability for adding liquids into the mixing chamber in measured rates.

The mixer device (e.g., the pressurizable mixer device) may be disposed in material transfer communication with an extruder/pelletizer device such that after the homogeneous mixture is made in the mixing chamber it may be transferred into the extruder for pelletizing. The mixer device disposed in communication with the extruder/pelletizer device may be referred to herein as a mixer/extruder/pelletizer system. The mixer/extruder/pelletizer system may be the Banbury Type 1D mixer/extruder/pelletizer system described later in the Examples.

In some aspects the constituents may be sequentially added to the mixing chamber in the following order: a first half of the major portion of the polyolefin (e.g., 45 to 49 weight parts), then all of any metal deactivator, then all of any first antioxidant, then all of any second antioxidant, and then the second half of the major portion of the polyolefin (e.g., 45 to 49 weight parts.

Each heat transfer fluid independently may be a gas, a vapor, or a liquid. The starting temperature of the heat transfer fluid may be ambient temperature (e.g., natural source air or water), greater than ambient temperature (heated air or steam), or less than ambient temperature (e.g., chilled air, chilled water, chilled brine, or chilled glycol).

Temperature of the contents of the mixing chamber (e.g., the initial polyolefin formulation, first admixture, or second admixture) may be monitored continuously or intermittently by the temperature sensor. The temperature sensor may be a thermometer, a thermocouple probe, or an infrared sensor; alternatively a thermocouple probe.

Weight parts is a relative quantity. For example, 100 weight parts of polyolefin may equal 1,000 grams (g) of polyolefin, in which case 6 weight parts of the liquid hydrocarbylsulfonic acid would equal 60 g of the liquid hydrocarbylsulfonic acid (0.06×1,000). Or 100 weight parts of polyolefin may equal 5,060 kilograms (kg) of polyolefin, in which case 4 weight parts of the liquid hydrocarbylsulfonic acid would equal 202 g of the liquid hydrocarbylsulfonic acid (0.04×5,060).

Prior to the method, the target 100 weight parts of the polyolefin in the homogeneous mixture is separated as a major portion such as from 90 to 98, alternatively from 92 to 95 weight parts, alternatively from 95 to 98 weight parts and a minor portion such as from 10 to 2 weight parts, alternatively from 8 to 5 weight parts, alternatively from 5 to 2 weight parts.

The polyolefin of the 90 to 98 weight parts and the polyolefin of the 10 to 2 weight parts independently may be an ethylene-based polymer or a propylene-based polymer. The ethylene-based polymer may be a polyethylene homopolymer; an ethylene/($C_4$-$C_{20}$)alpha-olefin copolymer; an ethylene/unsaturated carboxylic ester copolymer (e.g., ethylene/vinyl acetate (EVA) copolymer or ethylene/alkyl (meth)acrylate (EAA or EAM) copolymer); or a blend of any two or more thereof. The propylene-based polymer may be a polypropylene homopolymer; a propylene/ethylene copolymer; or a blend of any two or more thereof. The polyolefin independently may be the ethylene-based polymer. The ethylene-based polymer may be a hydrocarbon, such as the polyethylene homopolymer or the ethylene/($C_4$-$C_{20}$)alpha-olefin copolymer. The ethylene-based polymer may be a hydrocarbon, such as a high-density polyethylene (HDPE), which has a relatively high percent crystallinity and is useful as a carrier resin.

The ethylene-based polymer comprises from 51 to 100 wt % of ethylenic units derived from polymerizing ethylene and from 49 to 0 wt % of comonomeric units derived from polymerizing one, alternatively two olefin-functional monomer (comonomer) selected from propylene; a ($C_4$-$C_{20}$)alpha-olefin such as 1-butene, 1-hexene, or 1-octene; or an unsaturated carboxylic ester. The propylene-based polymer comprises from 51 to 100 wt % of propylenic units derived from polymerizing propylene and from 49 to 0 wt % of comonomeric units derived from polymerizing one, alternatively two olefin-functional monomer (comonomer) selected from ethylene; a ($C_4$-$C_8$)alpha-olefin such as 1-butene, 1-hexene, or 1-octene; or an unsaturated carboxylic ester. Examples of the ($C_4$-$C_{20}$)alpha-olefins are a ($C_4$-$C_8$)alpha-olefin such as 1-butene, 1-hexene, or 1-octene; and a ($C_{10}$-$C_{20}$)alpha-olefin.

The polyolefin granules may be porous or non-porous.

The liquid hydrocarbylsulfonic acid. A compound of formula R—$SO_3$H, wherein R is a ($C_1$-$C_{40}$)hydrocarbyl group, the compound having a definite volume but not a definite shape (fixed shape) at 25° C. The ($C_1$-$C_{40}$)hydrocarbyl group may be a ($C_1$-$C_{40}$)alkyl group, ($C_3$-$C_{40}$)cycloalkyl group, ($C_6$-$C_{40}$)aryl group, ($C_1$-$C_{10}$)alkyl-($C_6$-$C_{10}$)aryl group, or ($C_6$-$C_{10}$)aryl-($C_2$-$C_{20}$)alkyl group. The liquid hydrocarbylsulfonic acid may have a temperature characteristic (i) or (ii): (i) a freezing point of less than 0° C., alternatively from 0° to 20.0° C.; or (ii) a melting point from 20.1° to 99° C., alternatively from 30.0° to 79.9° C., alternatively from 40.0° to 69.9° C. The liquid hydrocarbylsulfonic acid may be provided as anhydrous, a hydrate, or an organic solvate.

The method and homogeneous mixture made thereby independently may contain only one liquid hydrocarbylsulfonic acid, alternatively a combination of two or more different liquid hydrocarbylsulfonic acids.

The method and homogeneous mixture made thereby independently may contain only one liquid additive, which is the liquid hydrocarbylsulfonic acid; alternatively the method and homogeneous mixture made thereby independently may contain the liquid hydrocarbylsulfonic acid and at least one liquid additive that is not a liquid hydrocarbylsulfonic acid.

The method and homogeneous mixture made thereby may further comprise at least one solid additive that is different than the polyolefin. Such additives independently may be may be inorganic or organic. Examples are carbon black, carbon nanotubes, diamond powder, graphite, graphene, powdered metals, powdered metal oxides, solid flame retardants, silica, alumina, and silicate glass beads.

The moisture-curable polyethylene formulation may comprise the (A) the HSG-FP Copolymer; the homogeneous mixture, and optionally any zero, one or more additives (B) to (H): (B) a metal deactivator; (C) antioxidant; (D) a colorant; (E) scorch retardant; (F) stabilizer; (G) processing aid; and (H) flame retardant.

The (A) (hydrolyzable-silyl group)-functional polyethylene (HSG-FP) Copolymer. The (A) HSG-FP Copolymer is made by copolymerizing monomers comprising ethylene and, optionally, olefin-functional comonomer(s) wherein at least one olefin-functional comonomer is the olefin-functional hydrolyzable silane. The composition of the (A) HSG-FP Copolymer may be characterized by constituent units selected from ethylenic units, alkylene-hydrolyzable silyl group units, optionally propylenic units, and optionally comonomeric units derived from the optional olefinic comonomer. Optionally, 0, 1, or more olefinic comonomer may be selected from a ($C_4$-$C_{20}$)alpha-olefin, an olefinically-unsaturated carboxylic acid, an olefinically-unsaturated carboxylic ester, an olefinically-unsaturated carboxylic anhydride, and combinations thereof. The carboxylic acid may be monocarboxylic or dicarboxylic. The carboxylic ester may be monocarboxylic ester, dicarboxylic monoacid monoester, or dicarboxylic diester. The olefinically-unsaturated carboxylic acid may be a terminally unsaturated ($C_2$-$C_8$)carboxylic acid, alternatively a (meth)acrylic acid, alternatively an unsaturated dicarboxylic acid. The olefinically-unsaturated carboxylic ester may be a vinyl ($C_2$-$C_8$) carboxylate ester, alternatively a vinyl ($C_2$-$C_5$)carboxylate ester (e.g., vinyl acetate, vinyl propionate, or vinyl butanoate), alternatively a ($C_1$-$C_8$)alkyl (meth)acrylate ester, alternatively a ($C_1$-$C_3$)alkyl (meth)acrylate ester, alternatively a di($C_1$-$C_8$)alkyl diester of an unsaturated dicarboxylic acid, alternatively a mono($C_1$-$C_8$)alkyl ester of an unsaturated dicarboxylic acid, alternatively a mono($C_1$-$C_8$)alkyl ester of maleic acid. The (meth)acrylate means $H_2C=CHCO_2$— or $H_2C=C(CH_3)CO_2$—. The CTA may be acetone, methyl ethyl ketone, propionaldehyde, 2-propanol, ethyl acetate, isobutene, butane, 2-methylpropane, ISOPARTM-C, ISOPARTM-E, ISOPARTM-H, or a combination of any two or more thereof. The CTA, when present, may be from 0.03 to 10 wt % of the polymerization reaction mixture.

The (A) HSG-FP Copolymer may be characterized by a total hydrolyzable silyl group content of from 0.43 to 0.99 mol %. The total mol % of hydrolyzable silyl group content is calculated from wt % values of hydrolyzable silyl group content(s), wherein the wt % values are determined according to the X-Ray Fluorescence (XRF) Test Method. For example, when the at least one alkenyl-functional hydrolyzable silane is vinyltrimethoxysilane (VTMS), its molecular weight is 148.23 g/mol, and at a comonomeric content is 2.0 wt %, the mol %=0.38 mol %. When VTMS comonomeric content is 5.0 wt %, the mol %=0.99 mol %. The mol % hydrolyzable silyl group content at any given wt % hydrolyzable silyl group content value will vary inversely with the molecular weight of the at least one alkenyl-functional hydrolyzable silane from which the hydrolyzable silyl groups are derived.

The (A) HSG-FP Copolymer contains hydrolyzable silyl groups. These groups independently may be a monovalent group of formula $(R^2)_m(R^3)_{3-m}Si$—, wherein subscript m is an integer of 1, 2, or 3; each $R^2$ is independently H, HO—, ($C_1$-$C_8$)alkoxy, ($C_2$-$C_6$)carboxy, phenoxy, ($C_1$-$C_6$)alkyl-phenoxy, ($C_1$-$C_6$)alkyl(H)N—, (($C_1$-$C_6$)alkyl)$_2$N—, ($C_1$-$C_6$)alkyl(H)C=NO—, or (($C_1$-$C_6$)alkyl)$_2$C=NO—; and each $R^3$ is independently ($C_1$-$C_8$)alkyl or phenyl. Each $R^2$ may be free of H and HO—, alternatively free of phenoxy and ($C_1$-$C_6$)alkyl-phenoxy. Each $R^2$ may be independently ($C_1$-$C_6$)alkoxy, ($C_2$-$C_6$)carboxy, (($C_1$-$C_6$)alkyl)$_2$N—, ($C_1$-$C_6$)alkyl(H)C=NO—, or (($C_1$-$C_6$)alkyl)$_2$C=NO—; alternatively ($C_1$-$C_6$)alkoxy; alternatively ($C_2$-$C_6$)carboxy; alternatively (($C_1$-$C_6$)alkyl)$_2$N—; alternatively ($C_1$-$C_6$)alkyl(H)C=NO—; alternatively (($C_1$-$C_6$)alkyl)$_2$C=NO—. All the hydrolyzable silyl groups of the (A) HSG-FP Copolymer may be the same. The hydrolyzable silyl groups are derived from the hydrolyzable silyl groups of the at least one alkenyl-functional hydrolyzable silane (comonomer) from which comonomeric units of the HSG-FP Copolymer containing such groups are made.

Optional additive (B) metal deactivator. Examples include hydrazine derivatives such as oxalyl bis(benzylidene hydrazide) (OABH) and 1,2-bis(3,5-di-tert-butyl-4-hydroxyhydrocinnamoyl) hydrazine; and 2,2'-oxamido-bis-(ethyl-3-(3,5-di-tert-butyl-4-hydroxyphenyl)propionate.

The moisture-curable polyethylene formulation may be free of (B). When present, the (B) metal deactivator may be from 0.01 to 1.5 wt %, alternatively 0.1 to 1.0 wt % of the total weight of the moisture-curable polyethylene formulation.

Optional additive (C) antioxidant: an organic molecule that inhibits oxidation, or a collection of such molecules. The (C) antioxidant is different in composition than the (F) stabilizer, which means when the moisture-curable polyethylene formulation contains both (C) and (F), the compound used as (C) is different than that used as (F). The (C) antioxidant functions to provide antioxidizing properties to the moisture-curable polyethylene formulation and/or a cured polymer product made by curing the moisture-curable polyethylene formulation. Examples of suitable (C) are bis(4-(1-methyl-1-phenylethyl)phenyl)amine (e.g., NAUGARD 445); 2,2'-methylene-bis(4-methyl-6-t-butylphenol) (e.g., VANOX MBPC); 2,2'-thiobis(2-t-butyl-5-methylphenol (CAS No. 90-66-4; 4,4'-thiobis(2-t-butyl-5-methylphenol) (also known as 4,4'-thiobis(6-tert-butyl-m-cresol), CAS No. 96-69-5, commercially LOWINOX TBM-6); 2,2'-thiobis(6-t-butyl-4-methylphenol (CAS No. 90-66-4, commercially LOWINOX TBP-6); tris[(4-tert-butyl-3-hydroxy-2,6-dimethylphenyl)methyl]-1,3,5-triazine-2,4,6-trione (e.g., CYANOX 1790); pentaerythritol tetrakis(3-(3,5-bis(1,1-dimethylethyl)-4-hydroxyphenyl)propionate (e.g., IRGANOX 1010, CAS No. 6683-19-8); 3,5-bis(1,1-dimethylethyl)-4-hydroxybenzenepropanoic acid 2,2'-thiodiethanediyl ester (e.g., IRGANOX 1035, CAS No. 41484-35-9); distearyl thiodipropionate ("DSTDP"); dilauryl thiodipropionate (e.g., IRGANOX PS 800); stearyl 3-(3,5-di-t-butyl-4-hydroxyphenyl)propionate (e.g., IRGANOX 1076); 2,4-bis(dodecylthiomethyl)-6-methylphenol (IRGANOX 1726); 4,6-bis(octylthiomethyl)-o-cresol (e.g. IRGANOX 1520); and 2',3-bis[[3-[3,5-di-tert-butyl-4-hydroxyphenyl]propionyl]] propionohydrazide (IRGANOX 1024). The (C) may be 4,4'-thiobis(2-t-butyl-5-methylphenol) (also known as 4,4'-thiobis(6-tert-butyl-m-cresol); 2,2'-thiobis(6-t-butyl-4-methylphenol; tris[(4-tert-butyl-3-hydroxy-2,6-dimethylphenyl)methyl]-1,3,5-triazine-2,4,6-trione; distearyl thiodipropionate; or dilauryl thiodipropionate; or a combination of any two or more thereof. The combination may be tris[(4-tert-butyl-3-hydroxy-2,6-dimethylphenyl)methyl]-1,3,5-triazine-2,4,6-trione and distearyl thiodipropionate. The moisture-curable polyethylene formulation may be free of (C). When present, the (C) antioxidant may be from 0.01 to 1.5 wt %, alternatively 0.1 to 1.0 wt % of the total weight of the moisture-curable polyethylene formulation.

Optional additive (D) a colorant. E.g., a pigment or dye. E.g., carbon black or titanium dioxide. The carbon black may be provided as a carbon black masterbatch that is a formulation of poly(1-butene-co-ethylene) copolymer (from ≥95 wt % to <100 wt % of the total weight of the masterbatch) and carbon black (from >0 wt % to ≤5 wt % of the total weight of the masterbatch. Carbon black is a finely-divided form of paracrystalline carbon having a high surface area-to-volume ratio, but lower than that of activated carbon. Examples of carbon black are furnace carbon black, acetylene carbon black, conductive carbons (e.g., carbon fibers, carbon nanotubes, graphene, graphite, and expanded graphite platelets). The moisture-curable polyethylene formulation may be free of (D). When present (D) may be from 0.1 to 35 wt %, alternatively 1 to 10 wt % of the moisture-curable polyethylene formulation.

Optional additive (E) scorch retardant. The (E) scorch retardant functions to inhibit premature moisture curing of the moisture-curable polyethylene formulation, wherein premature moisture curing would result from premature or prolonged exposure of the formulation to ambient air or when the mixture is at ambient temperature or elevated temperature (e.g., during later melt extrusion). Examples of (E) are octyltriethoxysilane and octyltrimethoxysilane and vinyltrimethoxysilane. The moisture-curable polyethylene formulation may be free of (E). When present (E) may be from 0.001 to 5.0 wt %, alternatively 0.01 to 3.0 wt %, alternatively 0.10 to 1.5 wt %, alternatively 0.15 to 1.0 wt % of the moisture-curable polyethylene formulation.

Optional additive (F) a stabilizer for stabilizing the moisture-curable polyethylene formulation against ultraviolet light (UV stabilizer). The (F) stabilizer is different in composition than the (C) antioxidant, which means when the mixture contains both (C) and (F), the compound used as (C) is different than that used as (F). Examples are a hindered amine light stabilizer (HALS), a benzophenone, or a benzotriazole. The (F) UV stabilizer may be a molecule that contains a basic nitrogen atom that is bonded to at least one sterically bulky organo group and functions as an inhibitor of degradation or decomposition, or a collection of such molecules. The HALS is a compound that has a sterically hindered amino functional group and inhibits oxidative degradation and can also increase the shelf lives of embodiments of the formulation that contain organic peroxide. Examples of suitable (F) are butanedioic acid dimethyl ester, polymer with 4-hydroxy-2,2,6,6-tetramethyl-1-piperidine-ethanol (CAS No. 65447-77-0, commercially LOWILITE 62); and N,N'-bisformyl-N,N'-bis(2,2,6,6-tetramethyl-4-piperidinyl)-hexamethylenediamine (CAS No. 124172-53-8, commercially Uvinul 4050 H). The moisture-curable polyethylene formulation may be free of (F). When present, the (F) UV stabilizer may be from 0.001 to 1.5 wt %, alternatively 0.002 to 1.0 wt %, alternatively 0.05 to 0.1 wt % of the moisture-curable polyethylene formulation.

Optional additive (G) processing aid: a molecule that decrease adherence of polymer melts in manufacturing equipment such as extruders and dies and to decrease melt fracture of materials in embodiments where the moisture-curable polyethylene formulation is used later therein. The (G) may be fluoropolymers, polyorganosiloxanes, metal salts of fatty carboxylic acids, fatty carboxamides, waxes, ethylene oxide (co)polymers, and non-ionic surfactants. The moisture-curable polyethylene formulation may be free of (G). When present, the (G) processing aid may be from 0.05 to 5 wt % of the moisture-curable polyethylene formulation.

Optional additive (H) flame retardant. The (H) flame retardant is a compound that inhibits or delays the spread of fire by suppressing chemical reactions in a flame. The (H) flame retardant may be (H1) a mineral, (H2) an organohalogen compound, (H3) an (organo)phosphorus compound; (H4) a halogenated silicone; (H5) a combination of any two or more of (H1) to (H4); (H6) a combination of any one of (H1) to (H4) and a flame-retardant synergist (e.g., antimony trioxide). The moisture-curable polyethylene formulation may be free of (H). When present, the (H) flame retardant may be from 0.1 to 80.0 wt %, alternatively 1 to 50.0 wt %; and alternatively 5 to 30.0 wt % of the moisture-curable polyethylene formulation.

The homogeneous mixture may further contain optionally any zero, one or more of the optional additives (B) to (H).

The homogeneous mixture and moisture-curable polyethylene formulation may be used to make a manufactured article. Examples are a coating on a substrate, a tape, a film, a layer of a laminate, a foam, and a pipe.

The moisture-curable polyethylene formulation may be moisture cured by exposure to ambient air or by immersion in hot water at 70° to 95° C. to make a cured polymer product. The extent of crosslinking of the cured polymer product may be characterized by measuring percent hot creep.

Alternatively precedes a distinct embodiment. May confers a choice, not an imperative. Optional(ly): is absent (or excluded), alternatively is present (or included).

Density: measured according to ASTM D792-13, *Standard Test Methods for Density and Specific Gravity (Relative Density) of Plastics by Displacement*, Method B (for testing solid plastics in liquids other than water, e.g., in liquid 2-propanol). Units of grams per cubic centimeter ($g/cm^3$).

Melt Index ("$I_2$"): measured according to ASTM D1238-13, using conditions of 190° C./2.16 kg, formerly known as "Condition E". Units of grams per 10 minutes (g/10 min.).

Wire Preparation Method: A reactor copolymer of ethylene and VTMS (vinyltrimethoxysilane at 1.5%). Available as Dow DFDB-5451 silane copolymer. The copolymer also contained 0.5% soaked octyltriethoxysilane as a moisture scavenger. In all comparative example and inventive examples, 95 wt % of the soaked copolymer was mixed with 5 wt % or 9 wt % of the homogeneous mixture (catalyst masterbatch) containing the rest of the additives, in a wire-line extruder to form 0.635 millimeter (mm, 25 mils) wall wires with 14 AWG conductors. Wires were then immersed in a 90° C. water bath for three hours for moisture-curing and crosslinking.

Hot Creep Test Method: Post-crosslinking, the wire samples made in the Wire Preparation Method were stripped to remove the conductor, and then the stripped insulation was analyzed for extent of crosslinking by hot creep test at 200° C. for 15 minutes under a load of 20 Newtons per square meter ($N/m^2$). The higher the degree of crosslinking, the lower the extent of elongation of a sample under the load and hence the lower the hot creep %.

Post-crosslinking, the mechanical properties of tensile strength and elongation were measured on an Instron machine using fully-crosslinked wire samples prepared by the Wire Preparation Method. The conductor was removed from 12.7 cm (5-inch) lengths of samples. Samples were tested at 25.4 cm per minute (cm/min., 10 inches/min.) per IEC 60502. Minimum values of tensile strength and elongation as per IEC 60502 specifications are 12 MPa (1800 pounds per square inch (psi)) and 200%, respectively.

Unaged and Aged Tensile and Elongation Test Methods. This is heat aging performance test without conductor: Conductors were removed from the crosslinked samples and the samples were heat aged in an oven at 135° C. for 168 hours per IEC-60502. At the end of the aging period the heat-aged samples were taken out of the oven and allowed to cool down under ambient conditions for a minimum of 16 hours. Tensile strength and elongation of the heat aged samples were then compared to that of unaged samples. As per IEC-60502, the samples pass the test if the difference between the tensile strength and elongation of the heat aged and unaged samples is less than 25%.

Mandrel Bending Test Method. This is an on-copper heat aging test. IEC-60502-2 specifies that if after heat aging, it is difficult to remove the insulation from the conductor without compromising it, Mandrel bend test should be performed. In Mandrel test, the unstripped wires (both conductor and insulation) prepared by the Wire Preparation Method were heat aged for 10 days at 150° C. The heat-aged wires are allowed to stand at room temperature for a minimum of 16 hours, and then wound around a mandrel at the rate of 5 seconds per turn. The IEC-60502-2 recommendations for diameter of the mandrel and the number of turns based on the thickness of the core were followed. A sample would pass the test if there are no crack in the insulation.

EXAMPLES

The following comparative and inventive examples were made using a Banbury Type 1D mixer/extruder/pelletizer system comprising, in sequential material flow communication, a Banbury Type 1D mixer device, an extruder device, and a pelletizer device. The Banbury 1D batch mixer is available from the HF Mixing Group, Freudenberg, Germany. The Banbury 1D batch mixer comprises a mixing chamber configured with a solids feed inlet for receiving solids to be mixed into the mixing chamber, a liquid injector for adding liquids into the mixing chamber, and drop door for allowing made batch mixture to exit the mixing chamber and be transferred directly to an extruder/pelletizer device. The Banbury 1D batch mixer also comprises a feed hopper for feeding the solids into the mixing chamber via the feed inlet. The Banbury 1D batch mixer also comprises a ram movable from an up position to a down position and vice versa. When the ram is in the up position, the feed inlet of the mixing chamber is open and allows the mixing chamber to receive solids from the feed hopper. When the ram is in the down position, the ram is sealing the feed inlet of the mixing chamber and pressing the materials contained in the mixing chamber, wherein the amount of pressing is controllable by setting the ram pressure. The Banbury 1D batch mixer also comprises a variable-speed, rotors (rotatable mixing elements) disposed in the mixing chamber and effective for mixing solids and liquid materials contained in the mixing chamber, wherein the rotors are designed for mixing in a first direction, then in a second direction that is orthogonal to the first direction. The Banbury 1D batch mixer also comprises a heat exchanger jacket in heat exchanging communication with the mixing chamber, rotors, and drop door. The mixing chamber of the Banbury 1D batch mixer has a volume of 16.1 liters (L) and a batch capacity of 12 kilograms (kg) using a specific gravity of 1 gram per milliliter (g/mL) and a fill factor of 0.75. The mixing conditions may be controlled by setting the pressure of the ram and the rotation speed of the mixing element. Suitable ram pressure may be from 0.138 to 0.552 megapascals (MPa). Suitable rotation speed may be from 40 to 100 rotations per minute (rpm). The extruder/pelletizer device is configured with the following series of screens for screening the batch mixture: 20 mesh/150 mesh/80 mesh/60 mesh/20 mesh.

Polyolefin 1: pellets of a high-density polyethylene having a density of $0.965 g/cm^3$ and a melt index ($I_2$) from 7.5 to 8.5 g/10 min. Available as DGDA-6944 from The Dow Chemical Company.

Polyolefin 2: pellets of a high-density polyethylene having a density of $0.955 g/cm^3$ and a melt index ($I_2$) of 1.2 to 1.8 g/10 min. Available as DMDC-1250 from The Dow Chemical Company.

Polyolefin 3: granules of a high-density polyethylene having a density of $0.945 g/cm^3$ and a melt index ($I_2$) of 0.87 to 1.07 g/10 min. Available as DFH-4593 H from The Dow Chemical Company.

Liquid hydrocarbylsulfonic acid 1: NACURE CD 2180 M (available from King Industries) with a viscosity of 2700 $mm^2/sec$.

Metal deactivator (B)-1: oxalyl bis(benzylidene)hydrazide (OABH).

Antioxidant (C)-1: NAUGARD 445 is 4-(1-methyl-1-phenylethyl)-N-[4-(1-methyl-1-phenylethyl)phenyl]aniline.

Antioxidant (C)-2: LOWINOX 2211346 is 4,4-Thiobis (6-tert-butyl-m-cresol).

Antioxidant (C)-3: DSTDP is distearyl Thiodipropionate.

Comparative Examples 1 and 2 (CE1 and CE2): two heterogeneous mixtures separately made using the Banbury Type 1D mixer/extruder/pelletizer system and constituents Polyolefin 1 or 2 (both pellets), liquid hydrocarbylsulfonic acid 1, metal deactivator (B)-1, antioxidant (C)-1, antioxidant (C)-2, and antioxidant (C)-3. The comparative method had six mixing phases, each defined as a cycle of ram up and ram down. At the start, the ram position was up and the drop door of the mixer was closed. PHASE 1: before the ram was sent down, constituents were sequentially added to the mixing chamber in the following order: first 50 weight parts (of a total of 100 weight parts) of Polyolef in 1, then all of metal deactivator (B)-1, then all of antioxidant (C)-2, and then the remaining 50 weight parts of Polyolefin 1. The objective of this first phase was to degas the materials. Mixing was commenced using pressure on the ram (ram pressure) 0.38 MPa (55 psi) and a rotor speed 105 rotations per minute (rpm). After 30 seconds of mixing, the ram was raised, indicating the end of the first phase. PHASE 2: with the objective of further mixing the materials until they were in liquid form, the ram was sent down again to start a second phase. The ram pressure and rotor speed were kept the same as the first phase. When shear heating had caused the temperature of the mixer contents to reach 160° C., the ram was sent up, indicating the end of second phase. PHASE 3: At the beginning of the third phase, the mixer contents had cooled below 160° C. Antioxidant (C)-1 was added to the mixer and mixing was started. The ram pressure was kept the same as in the first phase but the rotor speed was lowered to 85 rpm for more mixing time. Similar to the second phase, the ram was raised when shear heating had increased the temperature was 160° C., indicating the end of the third phase. PHASE 4: At the beginning of the fourth phase, the mixer contents had cooled below 140° C. Antioxidant (C)-3 was charged to the mixer chamber. Mixing was started until shear heating had increased the temperature to 140° C., indicating the end of the fourth phase. PHASE 5: At the beginning of the fifth phase, the mixer contents had cooled below 160° C. The liquid hydrocarbylsulfonic acid 1, contained in a plastics bag, was added into the mixer together with the plastic bag. Mixing was started with the ram pressure at 0.31 MPa (45 psi) and the rotor speed was 65 rpm for longer mixing time. After the batch temperature was 160° C., the ram was raised to relax the compounds and to let the materials to turn over, indicating the end of the fifth phase. PHASE 6: At the beginning of the sixth phase, the mixer contents had cooled below 160° C. The ram was sent down to start the sixth phase, in which liquid hydrocarbylsulfonic acid 1 was further mixed with the rest of the materials at the same processing conditions as in the fifth phase. The ram was raised when shear heating had caused the temperature to increase to 160° C., indicating the end of the sixth phase. The door of the mixer was opened, and the resulting admixture was dropped into the extruder chamber for pelletizing. The door of the mixer was then closed and the mixer was ready for the next process. CE2 was made using the same process as CE1 except Polyolefin 2 was used in CE2 in place of Polyolefin 1. The mixing operation conditions, order of addition by phase, mixing operation observations, batch mixture compositions, and batch mixture properties of CE1 and CE2 are shown later in Tables 1 to 5.

Inventive Examples 1 and 2 (IE1 and IE 2): two homogeneous mixtures were separately made using the Banbury Type 1D mixer/extruder/pelletizer system and constituents Polyolefin 3 (granules), liquid hydrocarbylsulfonic acid 1, metal deactivator (B)-1, antioxidant (C)-1, antioxidant (C)-2, and antioxidant (C)-3. The inventive method used liquid injection of liquid hydrocarbylsulfonic acid 1, which was metered into the mixer chamber from the drive side of the mixer. The method differed from that in CE1 and CE2. A minor portion of Polyolefin 3 (0.9 kg (2 pounds (lbs) of Polyolefin 3, representing 7.4 weight parts of the total amount of 12 kg (27 pounds), 100 weight parts of Polyolefin 3) was set aside. A major portion of Polyolefin 3, 11.2 kg (representing 92.6 weight parts) was divided into two equal portions of 46.3 weight parts each. The inventive method was conducted in three phases. At the beginning of the method, the ram position was up and the door of the mixer was closed. PHASE A: constituents were sequentially added to the mixing chamber in the following order: first 46.2 weight parts of Polyolefin 3, then all of metal deactivator (B)-1, then all of antioxidant (C)-2, then all if antioxidant (C)-3, and then the second 46.2 weight parts of Polyolefin 3 were added to the mixing chamber. The ram was lowered and mixing started. When shear heating had caused the batch temperature to reach 100° C., the pump of the liquid injection system was started to begin metering in the liquid hydrocarbylsulfonic acid 1 into the mixing chamber. The liquid addition time was about 3 minutes (which continued into the second phase described later). During the first phase, the ram pressure was 0.31 MPa (45 psi) and the rotor speed was 85 rpm. The ram was raised when shear heating had caused the batch temperature to reach 120° C., indicating end of the first phase. The materials were not fully molten yet. PHASE B: at the beginning of the second phase, all of antioxidant (C)-3 and the 7.4 weight parts of Polyolefin 3 were fed into the mixing chamber. The ram was then lowered and mixing started. The ram pressure and rotor speed were kept the same as the first phase. When shear heating had caused the batch temperature to increase to 140° C., the ram was raised to relax the compounds and to let the materials to turn over, indicating the end of the second phase. PHASE C: The ram was lowered and mixing started using the same ram pressure and rotor speed as in the second phase. When shear heating had caused the batch temperature to increase to 145° C., the ram was raised, indicating the end of the third phase. The resulting homogeneous mixture was removed from the mixer and dropped into the extruder chamber for pelletizing. The mixing operation conditions, order of addition by phase, mixing operation observations, batch mixture compositions, and batch mixture properties of IE1 and IE2 are shown later in Tables 1 to 5.

TABLE 1

Mixing operation conditions for CE1, CE2, IE1, and IE2.

| Mixing operation condition | CE1 | CE2 | IE1 | IE2 |
|---|---|---|---|---|
| Temperature of jacket, rotors, and drop door of Banbury Type 1D Mixer Device | Cooling at 15.5° C. | Cooling at 15.5° C. | Cooling at 15.5° C. | Cooling at 15.5° C. |
| Number of phases per batch | 6 | 6 | 3 | 3 |
| Rotor speed per phase (rpm) | 105, 105, 85, 85, 65, 65 | | 85, 85, 85 | |
| Ram pressure per phase (MPa) | 0.38, 0.38, 0.38, 0.31, 0.31 | | 0.31, 0.31, 0.31 | |
| Mixer contents maximum temperature per phase (° C.) | N/r, 160, 160, 140, 160, 160 | | 120, 140, 145 | |

An advantage of the inventive method is fewer phases required to make the inventive homogeneous mixtures of IE1 and IE2 (3 phases) compared to the six phases required to make the comparative heterogeneous mixtures of CE1 and CE2. Another benefit is the inventive homogeneous mixtures were made under milder mixing conditions (85 rpm maximum rotor speed, 0.31 MPa maximum ram pressure, and 145° C. maximum batch temperature) compared to the comparative mixing conditions (105 rpm maximum rotor speed, 0.38 MPa maximum ram pressure, and 160° C. maximum batch temperature).

TABLE 2

Order of addition by phase for CE1, CE2, IE1, IE2.

| Phase | CE1 | CE2 | IE1 | IE2 |
|---|---|---|---|---|
| 1 | 1. 50 wt. parts Polyolefin 1 or 2<br>2. Metal deactivator (B)-1<br>3. Antioxidant (C)-2<br>4. 50 wt. parts Polyolefin 1 or 2 | | Not applicable | |
| 2 | No addition | | Not applicable | |
| 3 | Antioxidant (C)-1 | | Not applicable | |
| 4 | Antioxidant (C)-3 | | Not applicable | |
| 5 | Liquid hydrocarbylsulfonic acid 1 | | Not applicable | |
| 6 | No addition | | Not applicable | |
| A | Not applicable | | 1. 46.3 wt. parts Polyolefin 3<br>2. Metal deactivator (B)-1<br>3. Antioxidan (C)-2 | |

TABLE 2-continued

Order of addition by phase for CE1, CE2, IE1, IE2.

| Phase | CE1 | CE2 | IE1 | IE2 |
|---|---|---|---|---|
| | | | | 4. Antioxidant (C)-3 |
| | | | | 5. 46.3 wt. parts Polyolefin 3 |
| | | | | 6. Some Liquid hydrocarbylsulfonic acid 1 |
| B | | Not applicable | | 1. Remainder Liquid hydrocarbylsulfonic acid 1 |
| | | | | 2. Antioxidant (C)-1 |
| | | | | 3. 7.4 wt. parts of Polyolefin 3 |
| C | | Not applicable | | No addition |

TABLE 3

Mixing operation observations for CE1, CE2, IE1, IE2.

| Mixing operation observation | CE1 | CE2 | IE1 | IE2 |
|---|---|---|---|---|
| Injection Type Liquid hydrocarbylsulfonic acid 1 | Bolus | Bolus | Metered | Metered |
| Form of HDPE Resin used | Pellets | Pellets | Granules | Granules |
| Time period to make batch (minutes) | 10 to 13 | 10 to 13 | 5.5 to 6 | 5.5 to 6 |
| Number of same example batches made consecutively without cleaning mixer device | 5 | 5 | 5 or 15 | 5 or 15 |
| Mixer Device Condition after making 5 consecutive batches of same example without cleaning ram | Blackened | Blackened | Clean | Clean |
| Mixer Device Condition after making 15 consecutive batches of same example without cleaning ram | Not tested | Not tested | Slightly discolored | Slightly discolored |
| Extent of incorporation of Liquid hydrocarbylsulfonic acid 1 indicated by Mixer Device Condition | Partial* | Partial | Complete | Complete |

*Partial means incomplete incorporation of liquid hydrocarbylsulfonic acid 1; the liquid hydrocarbylsulfonic acid 1 accumulated on mixer device.

As indicated in Table 3, in CE1 liquid hydrocarbylsulfonic acid 1 accumulated or pooled in the mixing chamber of the mixer device after 5 batches of CE1 were produced consecutively without cleaning the mixer device, leaving a dark stain on surfaces of the mixer device. Thus, the comparative method cannot fully incorporate all the liquid hydrocarbylsulfonic acid 1 at 4 wt % loading into the batch mixtures, but instead left some unincorporated liquid hydrocarbylsulfonic acid 1 from each batch mixture as a residue, the residue increasing as the number of consecutive batch mixtures made in the mixer device without cleaning increased to 5. The same results were observed for CE2.

In contrast in Table 3 in IE1, liquid hydrocarbylsulfonic acid 1 did not accumulate or pool in the mixing chamber of the mixer device after 5 batch mixtures of IE1 were produced consecutively without cleaning the mixer device, as no a dark stain on surfaces of the mixer device was observed. Even after making 15 consecutive batch mixtures of IE1 without cleaning the mixer device, only minimal dark staining as speckling on surfaces of the mixer device was observed, which may be attributed to some surface located liquid hydrocarbylsulfonic acid rubbing off of the batch mixture. Thus, the inventive method can fully incorporate all the liquid hydrocarbylsulfonic acid 1 at 4 wt % loading into the batch mixtures, and does not leave any unincorporated liquid hydrocarbylsulfonic acid 1 from each batch mixture as a residue. The same results were observed for IE2.

The improvement is believed to be due to at least two things. Firstly, the larger surface area of the granular resin versus pellets, which surface area of granular resin enables the liquid hydrocarbylsulfonic acid 1 to be completely incorporated into the Polyolefin 3. Secondly, the slower addition of the liquid hydrocarbylsulfonic acid 1 via using a liquid injection system.

TABLE 4

Compositions of batch mixtures CE1, CE2, IE1, IE2.

| Composition Constituents | CE1 | CE2 | IE1 | IE2 |
|---|---|---|---|---|
| Polyolefin 1 (HDPE pellets) (wt %) | 89.94 | 0 | 0 | 0 |
| Polyolefin 2 (HDPE pellets) (wt %) | 0 | 89.94 | 0 | 0 |
| Polyolefin 3 (HDPE granules) (wt %) | 0 | 0 | 89.44 | 89.44 |
| liquid hydrocarbylsulfonic acid 1 (wt %) | 4 | 4 | 4 | 4 |
| metal deactivator (B)-1 (wt %) | 0.76 | 0.76 | 0.76 | 0.76 |
| antioxidant (C)-1 (wt %) | 3.3 | 3.3 | 3.8 | 3.8 |
| antioxidant (C)-2 (wt %) | 1 | 1 | 1 | 1 |
| antioxidant (C)-3 (wt %) | 1 | 1 | 1 | 1 |
| Total (wt %) | 100 | 100 | 100 | 100 |

TABLE 5

Properties of batch mixtures CE1, CE2, IE1, IE2.

| Test Method | CE1 | CE2 | IE1 | IE2 |
|---|---|---|---|---|
| Retained tensile strength after heat aging in an oven (135° C., 168 hours) (%) | 55.2 | 50.9 | 81.6 | 88.9 |
| Retained elongation at break after heat aging in an oven (135° C., 168 hours) | 60.8 | 51.5 | 83.8 | 89.1 |
| Mandrel Bend Test | Pass | Pass | Pass | Pass |

Another advantage of the inventive method is a shorter total time period of making the inventive homogeneous mixtures of IE1 and IE2, which time period (5.5 to 6 minutes) was about half of the total period of time needed for making the heterogeneous mixtures of CE1 and CE2 (10 to 13 minutes). This is shown earlier in Table 3. Thus, the total exposure time of antioxidants in the inventive homogeneous mixtures of IE1 and IE2 in the mixer device was much shorter than the total exposure time for the comparative heterogeneous mixtures of CE1 and CE2 in the mixer device. This means that with the same amounts of antioxidants their antioxidizing effects carried through in IE1 and IE2 into the extrusion, pelletization and heat aging test to a greater extent than for CE1 and CE2.

As a result, pellets made from the batch mixtures of IE1 and IE2 had more available antioxidizing power, and thus increased heat aging properties relative to pellets made from batch mixtures of CE1 and CE2. This is shown in Table 5 as retentions of tensile strength and elongation at break for CE1 and CE2 are below 75%, which did not pass IEC-60502 requirement. For IE1 and IE2, beneficially the retained tensile strength and retained elongation at break are above 80%, which passes the IEC-60502 requirement. The significantly shorter total period of time required to make the inventive homogeneous mixtures of IE1 and IE2 relative to the period of time required to make the comparative heterogeneous mixtures of CE1 and CE2 is unpredictable, and leads to the beneficial improvement in heat aging performance of the inventive homogeneous mixtures of IE1 and IE2.

The invention claimed is:

1. A method of making in a mixer device a homogeneous mixture comprising from 1 to 6 weight parts of a liquid hydrocarbylsulfonic acid per 100 weight parts of a polyolefin, the method comprising steps (1) to (3): (1) mixing, in a pressurized mixing operation conducted in a pressurizable mixer device, liquid hydrocarbylsulfonic acid into an initial polyolefin formulation consisting essentially of from 90 to 98 weight parts of the polyolefin to give a first admixture, wherein the polyolefin is in the form of granules and wherein from the time of adding the liquid hydrocarbylsulfonic acid to the start of the mixing the temperature of the initial polyolefin formulation is in a first target temperature range from 95° to 105° C., and continuing the mixing until temperature of the first admixture increases to a second target temperature range from 115° to 125° C.; (2) adding from 10 to 2 weight parts of the polyolefin in the form of granules to the first admixture to give a second admixture; and (3) mixing, in a pressurized mixing operation conducted in a pressurizable mixer device, the second admixture until temperature of the second admixture increases to a final target temperature range from 145° to 150° C., thereby making in the mixer device the homogeneous mixture, wherein all of the liquid hydrocarbylsulfonic acid is incorporated into the 100 weight parts of the polyolefin.

2. The method of claim 1 wherein step (3) comprises mixing in a first direction the first admixture with the added from 10 to 2 weight parts of the polyolefin to give a second admixture and continuing the mixing until temperature of the second admixture is increased to a third target temperature range from 135° to 140° C.; followed by mixing in a second direction the second admixture until temperature of the second admixture is increased to the final target range from 145° to 150° C., wherein the second direction of mixing is orthogonal to the first direction of mixing.

3. The method of claim 1 wherein the initial polyolefin formulation in step (1) further consists essentially of at least one first solid additive, or a melt thereof; wherein the first admixture further consists essentially of the at least one first solid additive or the melt thereof; and wherein the homogeneous mixture comprises the 100 weight parts of the polyolefin, the from 1 to 6 weight parts of the liquid hydrocarbylsulfonic acid, and the at least one first solid additive.

4. The method of claim 1 wherein step (2) further comprises adding at least one second solid additive to the first admixture; wherein the second admixture further comprises the at least one second solid additive, or a melt thereof; and wherein the homogeneous mixture comprises the 100 weight parts of the polyolefin, the from 1 to 6 weight parts of the liquid hydrocarbylsulfonic acid, and the at least one second solid additive.

5. The method of claim 1 wherein the initial polyolefin formulation further consists essentially of at least one first solid additive, or a melt thereof; wherein the first admixture further consists essentially of the at least one first solid additive or the melt thereof; wherein step (2) further comprises adding at least one second solid additive to the first admixture; wherein the second admixture further comprises the at least one second solid additive, or a melt thereof; and wherein the homogeneous mixture comprises the 100 weight parts of the polyolefin, the from 1 to 6 weight parts of the liquid hydrocarbylsulfonic acid, the at least one first solid additive, and the at least one second solid additive.

6. The method of claim 1 wherein the number of weight parts of the liquid hydrocarbylsulfonic acid is from 2 to 6 per 100 weight parts of the polyolefin.

7. The method of claim 1 further comprising after step (3) a step (4) mixing at least a portion of the homogeneous mixture with a (hydrolyzable silyl group)-functional polyethylene copolymer (HSG-FP Copolymer) so as to give a moisture-curable polyethylene formulation comprising the at least portion of the homogeneous mixture and the HSG-FP Copolymer.

* * * * *